US008458197B1

(12) United States Patent
Procopio (10) Patent No.: US 8,458,197 B1
(45) Date of Patent: *Jun. 4, 2013

(54) SYSTEM AND METHOD FOR DETERMINING SIMILAR TOPICS

(75) Inventor: Michael Jeffrey Procopio, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,221

(22) Filed: Jan. 31, 2012

(51) Int. Cl.
*G06F 17/30* (2006.01)
(52) U.S. Cl.
USPC .......................................... 707/749
(58) Field of Classification Search
USPC .......................... 707/706, 723, 749
See application file for complete search history.

(56) References Cited

U.S. PATENT DOCUMENTS

| | | | |
|---|---|---|---|
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 * | 12/2010 | Flinn et al. ...................... | 706/11 |
| 2004/0088315 A1 | 5/2004 | Elder et al. | |
| 2004/0088322 A1 | 5/2004 | Elder et al. | |
| 2004/0088649 A1 | 5/2004 | Elder et al. | |
| 2004/0254911 A1 * | 12/2004 | Grasso et al. ..................... | 707/1 |
| 2005/0198044 A1 * | 9/2005 | Kato et al. ..................... | 707/100 |
| 2006/0195461 A1 | 8/2006 | Lo et al. | |
| 2007/0078889 A1 | 4/2007 | Hoskinson | |
| 2007/0150470 A1 * | 6/2007 | Brave et al. ....................... | 707/6 |
| 2009/0287682 A1 | 11/2009 | Fujioka et al. | |
| 2009/0319907 A1 * | 12/2009 | Tokuda .......................... | 715/739 |
| 2011/0016121 A1 * | 1/2011 | Sambrani et al. ............. | 707/734 |
| 2011/0113040 A1 * | 5/2011 | Bickel et al. .................. | 707/749 |
| 2011/0145719 A1 * | 6/2011 | Chen et al. ..................... | 715/739 |
| 2011/0258229 A1 | 10/2011 | Ni et al. | |
| 2012/0136812 A1 * | 5/2012 | Brdiczka .......................... | 706/12 |
| 2012/0173561 A1 * | 7/2012 | Kim et al. ..................... | 707/767 |

OTHER PUBLICATIONS

U.S. Appl. No. 13/363,024, filed Jan. 31, 2012, Procopio, et al.
U.S. Appl. No. 13/363,067, filed Jan. 31, 2012, Procopio, et al.

(Continued)

*Primary Examiner* — Cam-Linh Nguyen
(74) *Attorney, Agent, or Firm* — Young, Basile, Hanlon & MacFarlane, P.C.

(57) ABSTRACT

A method and system for determining similar topics may include receiving user information for one or more users, the information including at least one topic and a user value for each topic, where the user value represents how strongly the user is associated with that topic. Topic information for a source topic may be generated based on the user information, the topic information including at least one user and a topic value for each user, where the topic value represents how strongly the topic is associated with that user. Similarity scores may be generated based on a topic value for each user for the source topic and a topic value for the same user for each topic in a set of topics, where each topic in the set of topics is associated with a topic value for each user. Similar topics may be selected and output.

21 Claims, 6 Drawing Sheets

OTHER PUBLICATIONS

U.S. Appl. No. 13/363,152, filed Jan. 31, 2012, Procopio.
U.S. Appl. No. 13/363,126, filed Jan. 31, 2012, Procopio.
U.S. Appl. No. 13/363,094, filed Jan. 31, 2012, Procopio, et al.
U.S. Appl. No. 13/363,210, filed Jan. 31, 2012, Procopio.
U.S. Appl. No. 13/363,169, filed Jan. 31, 2012, Procopio.
U.S. Appl. No. 13/363,195, filed Jan. 31, 2012, Procopio.
James Allan, "Topic Detection and Tracking-Event-Based Information Organization," 2002, Kluwer Academic Publishers, Norwell, Massachusetts, USA; http://books.google.com/books?hl=en&lr=&id=50hnLl_Jz3cC&oi=fnd&pg=PR9&dq=topic+detection+and+tracking+event-based+information+organization&ots=nfu5nDwUa0&sig=U2ITFv2_AMnciqo9J8WLaS9lv98#v=onepage&q=topic%20detection%20and%20tracking%20event-based%20inform&f=false (last visited on Jan. 31, 2012).
Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).
Dr. E. Garcia, "Cosine Similarity and Term Weight Tutorial," http://www.miislita.com/information-retrieval-tutuorial/cosine-similarity-tutorial.html (last visited on Jan. 30, 2012).
U.S. Office Action, mailed on Nov. 21, 2012, in the related U.S. Appl. No. 13/363,169.

* cited by examiner

FIG. 1

USER X - USER SIGNATURE  210

| TOPIC | USER VALUE |
|---|---|
| A | 0.2 |
| B | 0.5 |
| C | 0.3 |

USER Y - USER SIGNATURE  220

| TOPIC | USER VALUE |
|---|---|
| B | 0.6 |
| C | 0.2 |
| D | 0.2 |

USER Z - USER SIGNATURE  230

| TOPIC | USER VALUE |
|---|---|
| B | 0.5 |
| D | 0.1 |
| E | 0.4 |

*FIG. 2*

TOPIC A - TOPIC SIGNATURE

| USER | USER VALUE | TOPIC VALUE (NORMALIZED USER VALUE) |
|---|---|---|
| X | 0.2 | 1.0 |
| Y | 0.0 | 0.0 |
| Z | 0.0 | 0.0 |

TOPIC B - TOPIC SIGNATURE

| USER | USER VALUE | TOPIC VALUE (NORMALIZED USER VALUE) |
|---|---|---|
| X | 0.5 | 0.31 |
| Y | 0.6 | 0.38 |
| Z | 0.5 | 0.31 |

TOPIC C - TOPIC SIGNATURE

| USER | USER VALUE | TOPIC VALUE (NORMALIZED USER VALUE) |
|---|---|---|
| X | 0.3 | 0.6 |
| Y | 0.2 | 0.4 |
| Z | 0.0 | 0.0 |

TOPIC D - TOPIC SIGNATURE

| USER | USER VALUE | TOPIC VALUE (NORMALIZED USER VALUE) |
|---|---|---|
| X | 0.0 | 0.0 |
| Y | 0.2 | 0.67 |
| Z | 0.1 | 0.33 |

TOPIC E - TOPIC SIGNATURE

| USER | USER VALUE | TOPIC VALUE NORMALIZED USER VALUE |
|---|---|---|
| X | 0.0 | 0.0 |
| Y | 0.0 | 0.0 |
| Z | 1.0 | 1.0 |

*FIG. 3*

400 SIMILARITY COMPUTATION FOR SOURCE TOPIC (E.G., TOPIC C) WITH SIGNATURE [0.6, 0.4, 0.0]

| TOPIC | SIMILARITY SCORE (SOURCE TOPIC v. TOPIC (n)) | SIMILAR / NOT SIMILAR | | |
|---|---|---|---|---|
| | | TOP N | FIXED (E.G., 0.75) | AUTO (E.G., 0.4) |
| TOPIC A | $\frac{[0.6, 0.4, 0.0] \cdot [1.0, 0.0, 0.0]}{\|[0.6, 0.4, 0.0]\| \|[1.0, 0.0, 0.0]\|} = 0.83$ | YES | YES | YES |
| TOPIC B | $\frac{[0.6, 0.4, 0.0] \cdot [0.31, 0.38, 0.31]}{\|[0.6, 0.4, 0.0]\| \|[0.31, 0.38, 0.31]\|} = 0.81$ | NO | YES | YES |
| TOPIC D | $\frac{[0.6, 0.4, 0.0] \cdot [0.0, 0.67, 0.33]}{\|[0.6, 0.4, 0.0]\| \|[0.0, 0.67, 0.33]\|} = 0.50$ | NO | NO | YES |
| TOPIC E | $\frac{[0.6, 0.4, 0.0] \cdot [0.0, 0.0, 1.0]}{\|[0.6, 0.4, 0.0]\| \|[0.0, 0.0, 1.0]\|} = 0.0$ | NO | NO | NO |

FIG. 4

| | | DEGREE OF USER OVERLAP: SOURCE TOPIC VS. TOPIC B | | |
|---|---|---|---|---|
| | | OUTPUT / NOT OUTPUT | | |
| USER | DEGREE OF OVERLAP (CONTRIBUTION) | TOP N | FIXED (E.G., 0.25) | AUTOMATIC (E.G., 0.1) |
| X | 0.19 | OUTPUT | NOT OUTPUT | OUTPUT |
| Y | 0.15 | NOT OUTPUT | NOT OUTPUT | OUTPUT |
| Z | 0.0 | NOT OUTPUT | NOT OUTPUT | NOT OUTPUT |

SYSTEM AND METHOD FOR DETERMINING SIMILAR TOPICS

CROSS REFERENCES TO RELATED APPLICATIONS

Ser. No. 13/363,067 is now pending, filed Jan. 31, 2012 for "SYSTEM AND METHOD FOR INDEXING DOCUMENTS";
Ser. No. 13/363,024 is now pending, filed Jan. 31, 2012 for "SYSTEM AND METHOD FOR COMPUTATION OF DOCUMENT SIMILARITY";
Ser. No. 13/363,152 is now pending, filed Jan. 31, 2012 for "SYSTEM AND METHOD FOR CONTENT-BASED DOCUMENT ORGANIZATION AND FILING";
Ser. No. 13/363,126 is now pending, filed Jan. 31, 2012 for "SYSTEM AND METHOD FOR DETERMINING ACTIVE TOPICS";
Ser. No. 13/363,094 is now pending, filed Jan. 31, 2012 for "SYSTEM AND METHOD FOR AUTOMATICALLY DETERMINING DOCUMENT CONTENT";
Ser. No. 13/363,210 is now pending, filed Jan. 31, 2012 for "SYSTEM AND METHOD FOR DETERMINING TOPIC AUTHORITY";
Ser. No. 13/363,169 is now pending, filed Jan. 31, 2012 for "SYSTEM AND METHOD FOR DETERMINING TOPIC INTEREST"; and
Ser. No. 13/363,195 is now pending, filed Jan. 31, 2012 for "SYSTEM AND METHOD FOR DETERMINING SIMILAR USERS."

BACKGROUND

Many different users may interact with information and data stored in databases. Users may, for example, interact with one or more documents including content related to one or more topics. It may desirable to determine and/or identify topics similar to or related to a given topic.

SUMMARY

Briefly, aspects of the present disclosure are directed to methods and systems for determining similar topics, which may include receiving user information for one or more users, the user information including at least one topic and a user value for each topic, where the user value represents how strongly the user is associated with that topic. Topic information for a source topic may be generated based on the user information, the topic information including at least one user and a topic value for each user, where the topic value represents how strongly the topic is associated with that user. Similarity scores may be generated based on a topic value for each user for the source topic and a topic value for the same user for each topic in a set of topics, where each topic in the set of topics is associated with a topic value for each user. One or more similar topics may be selected based on the generated similarity scores. One or more of the selected topics may be output.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example(s) and not limited in the accompanying figures.

BRIEF DESCRIPTION OF THE DRAWINGS

A more complete understanding of the present disclosure may be realized by reference to the accompanying figures in which.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 1:
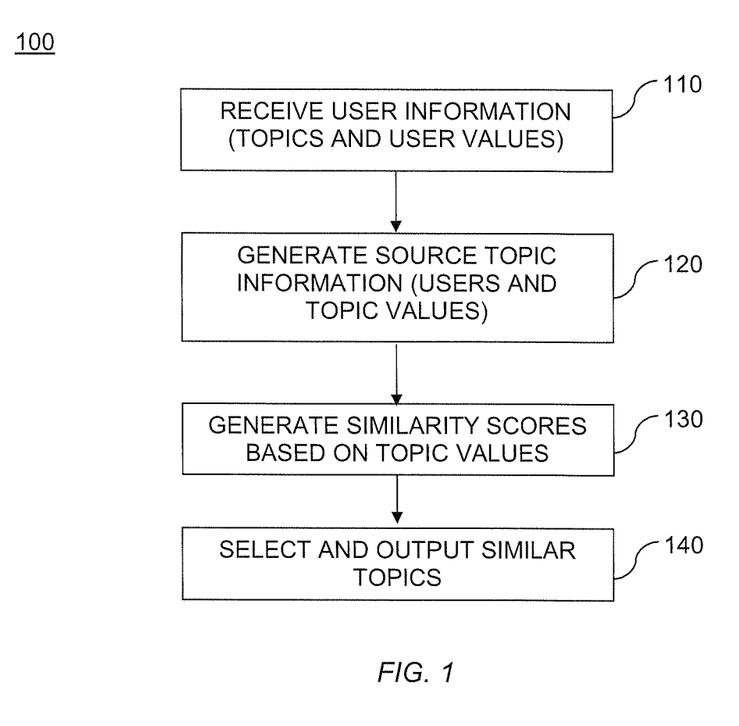
FIG. 1 is a flowchart of a method according to aspects of the present disclosure.
Figure 6:
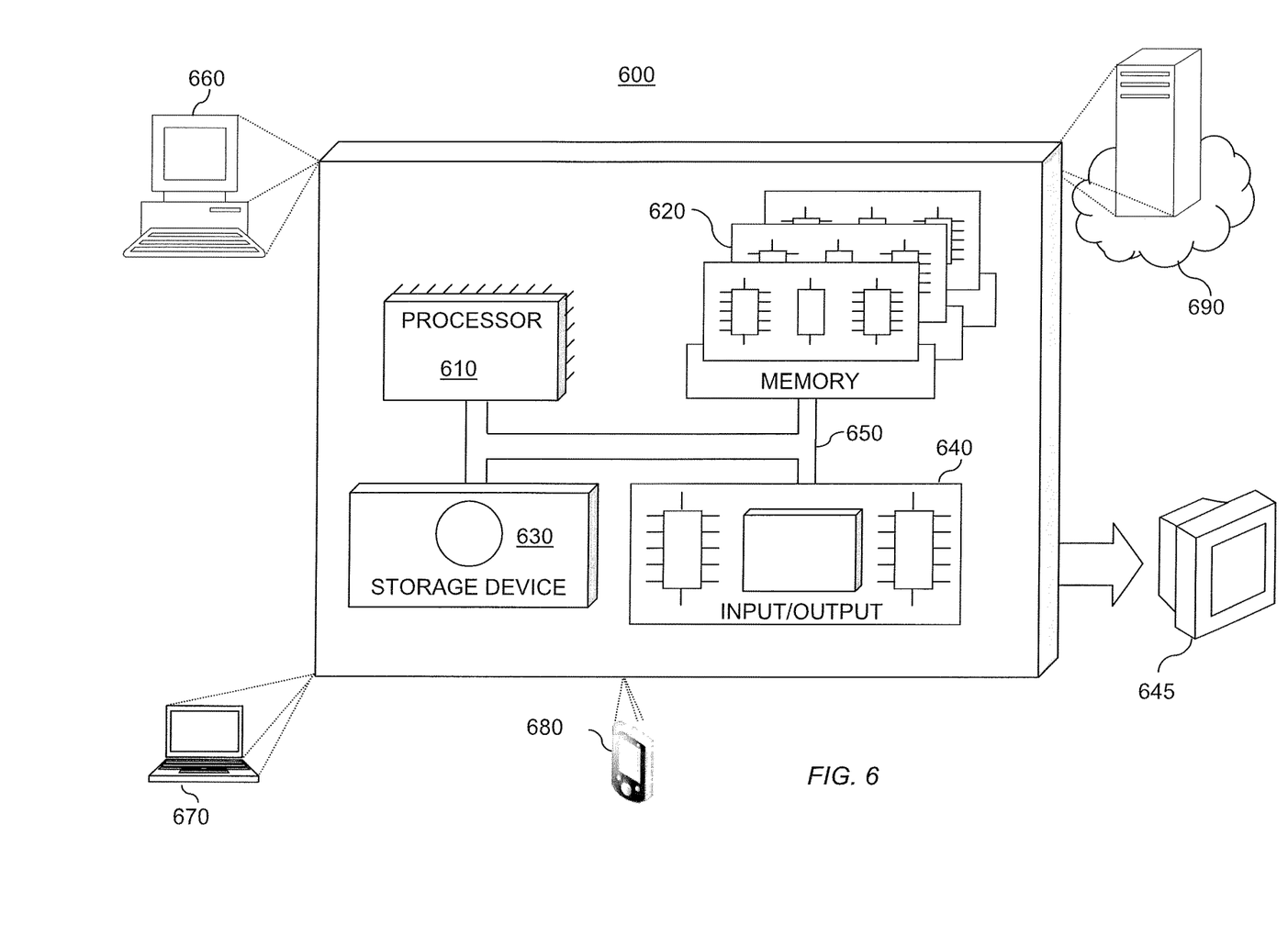
FIG. 6 is a schematic diagram depicting a representative computer system for implementing and exemplary methods and systems for determining similar topics according to aspects of the present disclosure.

In FIG. 1, there is shown a flow diagram 100, which defines steps of a method according to aspects of the present disclosure. Methods and systems of the present disclosure may be implemented using, for example, a computer system 600 as depicted in FIG. 6 or any other system and/or device.

In operation 110, user information for one or more users may be received by, for example, system 600. User information for a user (e.g., a user signature) may include, for example, at least one topic and a user value (e.g., a value) for each topic. A user value may represent how strongly a user is associated with a topic.

Topics may be, for example, categories, abstract ideas, subjects, things, and/or concepts representing content or subject matter of a file (e.g., a document, audio file, video file, spreadsheet, text file, word processing file, or other type of file). Topics may be, for example, an abstract notion of what a file (e.g., a document) pertains to, is related to, and/or is about. A topic may, in some aspects, be a concept that at least a portion of the file (e.g., document) is about. A topic may or may not be a term present in a document text but may be, for example, associated with one or more terms present in a document and may be generated by natural language processing (NLP) or other processes based on one or more terms in a document and/or other information. For example, a file (e.g., a document) may include information (e.g., text) about cars, planes, and boats, all of which appear as terms verbatim in the file. More abstractly, however, it may be determined that the file is about "vehicles" and "modes of transportation." Topics associated with the document may, therefore, be "vehicles," "modes of transportation," and/or other topics.

A user value may, for example, represent how strongly a user is associated with a topic. A user may be associated with a topic by, for example, interacting with files, documents, web pages, information, and/or data related to and/or including that topic. A user may interact with a file, document, web page, information, and/or data related to a topic by adding, removing, editing, viewing, and/or otherwise interacting with information related to a topic (e.g., information in a document, audio file, video file, spreadsheet, word processing file, text file, or any other type of file). A user may, for example, interact with a topic in a document by adding, removing, editing, and/or otherwise altering document content related to a topic. A user may interact with a topic by viewing, opening, subscribing to, tagging, starring, sharing, and/or otherwise interacting with a file or other data that includes text and/or content related to a topic.

Files as discussed herein may include documents, document text, video files, audio files, computer code, and/or any other type of file. Document text may be, for example, a text-based representation of a document. A document may include text (e.g., a word processing document, text file, portable document format (pdf), spreadsheet, or presentation) or may have text associated therewith, such as in a transcript, when the document is a video (e.g., a web-based video, digital video file, or any other type of video), an audio file (e.g., an audio recording, podcast, or any type of audio), and/or another type of electronically stored file. A document may, in some aspects, be a web-page, computer instructions (e.g., computer code in any language), or any other internet and/or computer related file. Document text may be present in a document text file separate from the document. In that case, the document text file may be linked to and/or stored with the document and/or may be stored separately. It will be understood that operations involving the text of a document may be performed on or with the document or the document text file depending on the location of text.

In some aspects, user information for one or more users (e.g., including at least one topic and a user value for each topic) may be received from an automatic process operating on data associated with the one or more users. An automatic process operating on data associated with a user may, for example, be a process, method and/or approach using natural language processing (NLP), user topic interest computation, user topic authority computation, and/or other approaches to determine user association with one or more topics. An automatic process for determining user topic authority may, for example, be used to generate for a user one or more topics and a user authority value for each topic representing a level, amount, and/or strength of a user's expertise or authority in a topic. An automatic process for determining user topic interest may, for example, be used to generate for a user one or more topics and a user interest value for each topic representing a level, amount, and/or extent of a user's interest in a topic.

In some aspects, a user value may include a user authority value. A user authority value may be a user authority signature value (e.g., authority signature value) as discussed in patent application Ser. No. 13/363,210, filed Jan. 31, 2012 for "SYSTEM AND METHOD FOR DETERMINING TOPIC AUTHORITY," which is incorporated herein by reference. A user authority value may, for example, represent a user's authority or expertise related to a topic. A user authority value (e.g., user authority signature value) for a topic may, for example, be generated based on authorship information for a user for one or more files (e.g., documents), weights of topics in the one or more files, and/or other information. Authorship information for a file (e.g., a document) may include for each topic in the document at least one user (e.g., author) and an authorship percentage (e.g., topic authorship percentage) for each user (e.g., author). Authorship information may, for example, include for each of one or more topic(s) in a document, an authorship, contribution, and/or creation percentage for each user (e.g., author). An authorship percentage for a user may, for example, represent a portion, amount, or quantity of a topic authored, generated, and/or created by that user (e.g., author). A user authority value for a topic may be, for example, a sum of products across one or more documents, each product term including a product of an authorship percentage for a topic in a document and a weight of that topic in that document.

In some aspects, a user value may include a user interest value. A user interest value may be a user interest signature value (e.g., an interest signature value) as discussed in patent application Ser. No. 13/363,169, filed Jan. 31, 2012 for "SYSTEM AND METHOD FOR DETERMINING TOPIC INTEREST," which is incorporated herein by reference. A user interest value may, for example, represent a degree, amount, extent, and/or strength of a user's interest in and/or association with a topic. A user interest value may, for example, be a sum of products of one or more values representing user interest in a file (e.g., a document) and a weight of a topic in that file (e.g., document). A value representing user interest in a file may, for example, represent a degree, magnitude, and/or strength of a user's interest in a file (e.g., a document). A value representing a user's interest in a file may, for example, be calculated based on document interaction characteristics, document access characteristics, document editing characteristics, and/or document sharing characteristics. A product of a value representing a user's interest in a file and a weight of a topic in that file may represent and/or quantify a user's interest in that topic in that file. One or more products of values representing a user's interest in a file and a weight of a topic in that file for one or more files may be summed to generate an interest value of that topic for a user.

A user value may, in some aspects, represent a confidence of association between a topic and a user. A user value (e.g., corresponding to a topic) may represent a confidence, certainty, and/or likelihood that a user is associated with a topic. For example, a user value (e.g., 0.70) may indicate a confidence of 70% that a user is related to a topic (e.g., the user is interested in the topic, has authority on the topic, or is otherwise associated with the topic).

In some aspects, user information for one or more users may be received from a user. User information for one or more users may include for each user at least one topic and a user value for each topic for that user. User information for one or more users may be received from, for example, a user among the one or more users or any other user. User information may be received from a user (e.g., a source user or any other user) by way of, for example, a component or device associated with system 600. For example, a user may wish to identify or determine similar topics to one or more topics that the user may be interested in. The user may input user information including at least one topic and user value for each topic.

In some aspects, a source topic identified by a user may be received. A user may, for example, identify a source topic by inputting an identity of a source topic to system 600, selecting a source topic from a set of topics (e.g., a list of topics), or otherwise identifying a source topic. The source topic and at least one topic and user value for each topic may be used to select one or more topics similar to the source topic.

In operation 120, topic information for a source topic may be generated based on user information. Topic information may include at least one user and a topic value for each user. Topic information for a source topic may, for example, include one or more users and a topic value for each user. A topic value may, for example, represent how strongly a topic is associated with a user.

A topic value may, in some aspects, be based on or be equivalent to a user value. For example, a topic value representing how strongly a topic is associated with a user may be based on or equivalent to a user value representing how strongly that user is associated with that topic. In some aspects, one or more topic values for a topic may generated by determining one or more users associated with that topic and a user value for each of the users of that topic.

In some aspects, topic information for a topic (e.g., a source topic) may be generated by referencing and storing, for each topic, one or more user values associated with that topic. The user values for that topic for one or more users may be normalized to generate topic values for that topic for each of the users.

User values for one or more topics may, for example, be stored in one or more arrays, vectors, matrices, tables, and/or other data structures of user values for a user for one or more topics. An array of topic values for a topic may, for example, be generated by referencing each array of user values that include a user value for a user of that topic. The user values for each user of that topic may be stored in an array of topic information for that topic.

In some aspects, one or more user values (e.g., each user value for a topic for that user) stored in an array of topic information may be normalized to generate topic values (e.g., normalized user values) for each user. User values for each topic may be normalized such that all topic values for a topic (e.g., normalized user values) sum to 1.0, 100%, and/or any other value. Topic values (e.g., normalized user values) may be computed and/or generated by, for example, dividing each user value for each of one or more users for that topic by a sum of all user values for each of the one or more users for that topic.

By way of example, user information may be received for two users: user X and user Y. As shown in the following array and/or table, user information for user X may include three topics (e.g., topic A, topic B, and topic C) and a user value for each topic (e.g., topic A user value, topic B user value, and topic C user value). User information for user Y may include three topics (e.g., topic B, topic C, topic D) and a user value for each topic (e.g., topic B user value, topic C user value, and topic D user value).

TABLE 1

Array of User Values for a User for Topic(s)

|  | USER X USER VALUE | USER Y USER VALUE |
| --- | --- | --- |
| TOPIC A | 0.2 | 0.0 |
| TOPIC B | 0.5 | 0.6 |
| TOPIC C | 0.3 | 0.2 |
| TOPIC D | 0.0 | 0.2 |

Topic information for one or more topics (e.g., topic A, topic B, topic C, and topic D) may be generated by, for example, referencing and storing user values for one or more users from the above array (e.g., Table 1). As shown in the array and/or table below, a user value array may be referenced to generate an array of user values for each topic (e.g., an inverted array of user values, transposed array of user values).

TABLE 2

Inverted Array of User Values for a User for Topic(s)

|  | TOPIC A | TOPIC B | TOPIC C | TOPIC D |
| --- | --- | --- | --- | --- |
| USER X | 0.2 | 0.5 | 0.3 | 0.0 |
| USER Y | 0.0 | 0.6 | 0.2 | 0.2 |

Topic information for topic A may include one user (e.g., user X) and a user value for user X for topic A (e.g., 0.2). Topic information for topic B may include two users (e.g., user X and user Y), a user value for user X for topic A (e.g., 0.5), and a user value for user Y of topic B (e.g., 0.6). Topic information for topic C may include two users (e.g., user X and user Y), a user value for user X for topic C (e.g., 0.3), and a user value for user Y of topic C (e.g., 0.2). Topic information for topic D may include two topics (e.g., user Y) and a user value for user Y for topic D (e.g., 0.2).

In some aspects, user values for one or more users for each topic may be normalized to generate topic values for each topic. User values may be normalized such that all normalized user values and/or topic values for a topic sum to 1.0, 100%, or any other value. As shown in the array and/or table below, user values for one or more topics taken from and/or referenced from Tables 1 and 2 above may be normalized to generate topic information for four topics (e.g., topic A, topic B, topic C, and topic D).

TABLE 3

Topic Values for a Topic for One or More Users

|  | TOPIC A | TOPIC B | TOPIC C | TOPIC D |
| --- | --- | --- | --- | --- |
| USER X | 1.0 | 0.45 | 0.6 | 0.0 |
| USER Y | 0.0 | 0.55 | 0.4 | 1.0 |

Topic information for topic A may include, for example, one user (e.g., user X) and a topic value for user X (e.g., 1.0). A topic value for user X of 1.0 may indicate and/or represent that only one user (e.g., user X) has authority, is interested, and/or has otherwise interacted with documents or files including topic A. In this example, a topic value for user Y may be equal to 0.0 (e.g., zero), which may indicate that user Y has not interacted with topic A (e.g., user Y may not have authority in, interest in, or expertise related to topic A). Topic information for topic B may include two users (e.g., user X and user Y), a topic value for user X (e.g., 0.45), and a topic value for user Y (e.g., 0.55). Topic information for topic C may include two users (e.g., user X and user Y), a topic value for user X (e.g., 0.6), and a topic value for user Y (e.g., 0.4). Topic information for topic D may include, for example, one user (e.g., user Y) and a topic value for user Y (e.g., 0.0).

In operation 130, similarity scores may be generated based on topic values. Similarity scores between a source topic and a topic in a set of topics may be generated based on a topic value for each user for the source topic and a topic vale for the same user in the topic in the set of topics. Each topic in a set of topics may be associated with a topic value for each user. In some aspects, similarity scores may be generated between a source topic and each topic in a set of topics based on a topic value for each user for the source topic and a topic value for the same user for each topic in a set of topics. A topic value may be, for example, a number, percentage, scalar, and/or other type of value. One or more topic values for a topic may, for example, be included in a vector, array, matrix, table, and/or any other type of data set.

A similarity score between a source topic and a first topic may be, for example, equal to a sum of products of topic values for the source topic and topic values for the first topic. Each product in the sum of products may be a product of a topic value for a user for the source topic and a topic value for the same user for the first topic.

Similarity scores between a source topic and one or more topics in a set of topics may be generated. A set of topics may include, for example, one or more topics associated with a group, collection, category, and/or other set of topics. A source topic may, in some aspects, be included in or be a member of one or more sets of topics. Each topic in a set of topics may be associated with a topic value (e.g., including at least one user and a topic value for each user).

A topic value (e.g., a topic authority value, a topic interest value) for a source topic may, for example, be compared to topic values for each of one or more topics in a set of topics. Each comparison may be between two topics (e.g., a source topic and a topic in a set of topics). In comparing topic values, a topic value for a user associated with a source topic may be compared to a topic value for the same user for the topic within a set of topics. Similarity scores may be generated based on the comparison (e.g., one similarity score may be computed for each pair-wise topic comparison between the source topic and a topic within the set of topics). A process of generating similarity scores may be repeated for each user associated with a source topic.

In some aspects, a similarity score may be generated by computing a sum of products of topic values, a cosine similarity of topic values, or using other mathematical approaches. A similarity score may be generated by computing a sum of products of topic values for a source topic and respective topic values associated with a topic within a set of topics. For example, a similarity score between a source topic and a topic within a set of topics may be computed by multiplying a topic value for a user for the source topic by a topic value for the same user for the topic within the set of topics. The process may be repeated for each topic value for the source topic for each user and each topic value for the topic within the set of topics for each user. The process may be repeated for each topic value for each topic (e.g., among the set of topics).

In some aspects, a particular topic value for a topic for a user may be zero, if the user has not interacted with (e.g., viewed, edited, drafted, and/or otherwise interacted with) any documents including that topic. In that case, a similarity score (e.g., product of a topic value for a first topic for that user of zero multiplied a topic value for a second topic for the same user) may result in a similarity score of zero (e.g., 0.0) indicating no similarity between the two topics with respect to that user.

In some aspects, similarity scores may be generated by computing or calculating a cosine similarity of topic values for each user associated with a source topic. A cosine similarity value, score, or parameter may be a quantity representing how similar a vector representing topic values associated with a first topic is to a vector representing topic values associated with a second topic. A cosine similarity score may be, for example, a number between 0.0 and 1.0, a percentage, any range of numbers, and/or value(s). A cosine similarity, Sim(S,T), may be calculated using an equation such as:

$$Sim(S, T) = cosine\theta = \frac{S \cdot T}{\|S\|\|T\|}$$

A cosine similarity, Sim(S,T) may, for example, be calculated based on a vector representing topic values, S for a source topic and a vector representing topic values for a topic in a set of topics, T. A cosine similarity score may be, for example, a normalized dot product of a vector representing topic values for a source topic, S and a vector representing topic values for a topic included in a set of topics, T. A vector representing topic values for a source topic, S may include topic values for each user associated with a source topic. A vector representing topic values for a topic within a set of topics, T may include topic values for each user for that topic. If a user (e.g., a source user or a user in a set of users) has not interacted with a topic, a topic value of zero may be assigned to that user in a vector representing topic values for that topic.

A dot product or sum of products may be normalized by dividing the dot product by a product of a norm of a vector representing topic values associated with a source topic, $\|S\|$ and a norm of a vector representing topic values associated with a topic in a set of topics, $\|T\|$. A vector norm may, for example, be a length and/or magnitude of a vector (e.g., Euclidian distance of a vector). Normalizing the dot product may, for example, ensure that each similarity score (e.g., cosine similarity score) is between 0 and 1 or another range.

As shown in the following table, a similarity score may be generated between a source topic and a first topic (e.g., a topic in a set of topics). A similarity score (e.g., a cosine similarity of topic values) between a source topic and a first topic may be generating based on a vector representing topic values associated with a source topic (e.g., [0.6, 0.4, 0.0]) and a vector representing topic values associated with the first topic (e.g., [1.0, 0.0, 0.0]).

| Example Similarity Scores | | |
| --- | --- | --- |
| TOPIC VALUES FOR SOURCE TOPIC | TOPIC VALUES FOR A FIRST TOPIC | SIMILARITY SCORE (BETWEEN SOURCE TOPIC AND FIRST TOPIC) |
| [0.6, 0.4, 0.0] | [1.0, 0.0, 0.0] | $\frac{[0.6, 0.4, 0.0] \cdot [1.0, 0.0, 0.0]}{\|[0.6, 0.4, 0.0]\| \|[1.0, 0.0, 0.0]\|} = 0.83$ |

A similarity score between a source topic and a first topic may be, for example, a cosine similarity of topic values for each user, which may be equal to 0.83. Similarity scores may also be generated between the source topic and other topics in a set of topics using a similar approach.

In operation 140, similar topics (e.g., one or more similar topics) may be selected and output. One or more similar topics may be selected based on generated similarity scores (e.g., similarity scores between a source topic and each of one or more topics in a set of topics). Topics may, for example, be ranked, grouped, and/or categorized based on similarity scores, and one or more similar topics may be selected based on the ranking, grouping, and/or categorization.

In some aspects, one or more topics associated with one or more highest generated similarity scores may be selected. For example, a highest ranked topic in a set of topics or a topic associated with a highest similarity score may be selected. In some aspects, any number of highest ranked topics (e.g., a top-N scoring and/or ranking topics or a list of the top-N scoring and/or ranking topics) may be selected. A number of topics to be selected may be determined by, for example, a topic, a system, or device in system 600, and/or any other system or device.

According to some aspects, selecting one or more similar topics may include comparing a similarity score for each topic in a set of topics (e.g., a similarity score between a source topic and each topic in a set of topics) to a threshold similarity score and selecting one or more similar topics based on the comparison. A threshold similarity score may be, for example, a predetermined threshold similarity score (e.g., a fixed threshold similarity score, a static threshold similarity score, a manual threshold similarity score), a varying threshold similarity score, or any other type of threshold similarity score. A predetermined threshold similarity score may be any similarity score generated by, for example a user, system 600, or another system and/or process. One or more topics associated with similarity scores above a threshold similarity score may be selected and/or may be deemed similar topics. One or more selected topics may be output to, for example, a user, a component of system 600, and/or any other system or device.

In some aspects, one or more topics associated with similarity scores above an automatically determined threshold similarity score may be deemed similar topics and may be selected. An automatically determined threshold similarity score may, for example, be dependent on one or more similarity scores, each similarity score between a source topic and a topic (e.g., in a set of topics). An automatically determined threshold similarity score may, for example, be generated based on a distribution of similarity scores and may change as similarity score data is added, removed, and/or altered within the similarity score distribution.

In some aspects, an automatically determined threshold similarity score may be generated, for example, using an automatic threshold detection process or other approaches. In an automatic threshold detection process, a threshold may be determined based on set of similarity score data. An automatic threshold detection process may, for example, be a K-means, difference in means, hierarchical agglomerative clustering, or similar approach in which similarity score data is divided into groups and/or clusters based on computed mean similarity score values for each group and/or cluster (e.g., average values, median values, etc.). An automatically determined threshold similarity score may, in some aspects, be a boundary between groups of similarity score data and may be determined to group similarity score data into one or more groups, each group including similarity score values within a minimized range of the other values in the group or an average of all values in the group. An automatically determined threshold similarity score may, therefore, be related to the similarity score data set and may vary as similarity score data is added, removed, and/or altered. Each of one or more topics may be categorized into a group of topics based on whether a similarity score associated with that topic is above or below the one or more threshold similarity scores.

By way of example, a set of similarity score data may include values of 0.0, 0.1, 0.6, 0.8, 0.85, and/or possibly other values. Based on the similarity score data, an automatically determined threshold may be generated to divide the data into, for example, two groups and/or clusters. An automatically determined threshold, which divides the similarity score data into two groups may be, for example, 0.4. All of the similarity score values above 0.4 (e.g., 0.6, 0.8, and 0.85) may, for example, be assigned to one group and all of the similarity score values below 0.4 (e.g., 0.0 and 0.1) may be assigned to a second group. An automatically determined threshold of 0.4 may, for example, divide the values into two groups, and the values in each group may be within a minimized distance of the average value of the group. For example, an average of the first group values may be 0.75 (e.g., (0.6+0.8+0.85)/3) and each value in the first group may be within 0.15 of the average value (e.g., 0.75). Similarly, each value in the second group may be within 0.05 of the group average (e.g., 0.05=(0.0+0.1)/2).

For example, if a new topic is added to a set of topics, a similarity score between the new topic and a source topic may be generated. As a result of the new similarity score, a data distribution of similarity scores associated with the source topic (e.g., between the source topic and each of one or more topics in a set of topics) may change. A varying threshold similarity score that is determined based on similarity scores between a source topic and each of one or more topics in a set of topics may, therefore, also vary as a result of changes to topic(s) in a set of topics.

Similarly, an automatically determined similarity score may be altered if topics are removed from a set of topics, topic values associated with one or more topics in a set of topics change, or based on other events or changes.

Similar topics may include a cluster or group of topics associated with best, high, or most favorable similarity scores. For example, a subset of topics may be a predetermined number of topics with best or most favorable similarity scores. Best or most favorable similarity scores may be, for example, similarity scores indicating a highest similarity between a source topic and a topic (e.g., within a set of topics).

In some aspects, a number of similar topics may be limited to a maximum predetermined number of topics. A maximum predetermined number of topics may be set by a user (e.g., in a settings dialog, panel, screen, menu, and/or other interface), may be automatically determined, or may be set by another system or device.

In some aspects, a source topic may be a topic in a set of topics. User information may be received for one or more users (e.g., including at least one topic and a user value for each topic), topic information for a source topic (e.g., including at least one user and topic value for each user) may be generated based on the user information, similarity scores may be generated based on a topic value for each user for the source topic and a topic value for the same user for each topic in a set of topics, one or more similar topics may be selected based on the generated similarity scores, and one or more similar topics may be output. The steps (e.g., receiving user information, generating topic information, generating similarity scores, selecting one or more similar topics, and outputting one or more similar topics) may be repeated for each topic in a set of topics.

In some aspects, each topic in a set of topics may be assigned to one or more groups of topics based on generated similarity scores (e.g., between a source topic and the each topic in a set of topics). One or more groups of topics may, for example, be output to a user, system 600, and/or another device or system. Topics may be categorized into groups (e.g., classes, categories, buckets, and/or bins of topics) using, for example, an automatic grouping, clustering, or other approach. In an automatic grouping approach, one or more automatically determined threshold similarity scores may be generated, for example, using an automatic threshold detection or another approach.

By way of example, one or more topics may be categorized, classified, and/or grouped into three or any other number of groups of topics based on similarity scores. One or more topics associated with similarity score values above a first threshold similarity score (e.g., an automatically determined threshold similarity score) may, for example, be categorized into a first group. Similarly, one or more topics associated with similarity scores below the first threshold similarity score and above a second threshold similarity score (e.g., an automatically determined threshold similarity score) score may be categorized into a second group. One or more topics associated with similarity scores below the second threshold similarity score may be categorized into a third group of topics. Any number of threshold similarity scores may be used to group topics into any number of categories, groups, or sets of topics.

In some aspects, a title for a group of topics may be generated based on topics present in the group of topics. A title for a group of topics may, for example, be generated based on one or more topics in the group of topics using a natural language processing (NLP) or a similar method or process. For example, a group of topics may include three topics (e.g., topic A: airplanes, topic B: bicycles, and topic C: cars) or any other number of topics. Based on the topics in the group of topic it may be determined that a title for the group of users should be, for example, "modes of transportation", "vehicles", "airplanes", "bicycles", "cars", or another title based on an identity of the topics in the group of topics.

In some aspects, the receiving, generating topic information, generating similarity scores, selecting, and outputting steps may be initiated in response to a user selecting a source topic. Operation 110, operation 120, operation 130, and operation 140 may be performed in response to input from a user (e.g., a user selecting a source topic), a trigger event, or in response to any other input. In response to a user selecting a source topic, a trigger event, or any other action, user information for one or more users may be received, topic information for the source topic may be generated, similarity scores between the source topic and one or more topics in a set of topics may be generated, one or more similar topics may be selected based on the generated similarity scores, and one or more similar topics may be output. A trigger event may be, for example, an addition of a topic to a set of topics, addition of a user to a set of users, creation of a new user (e.g., addition of user information for a new user), creation of a new set of users (e.g., a group of users), creation of a new set of topics, editing information for a user in a set of users, removal of a user from set of users, a change of information for a user in a set of users, or any other event or action, which may result in a change to a set of users, a set of topics, or other information. A trigger event may, for example, occur at any time and may be the result of user input, other processes or systems, or other factors.

In some aspects, an identity of one or more similar topics may be output in response to input from a user. A user may, for example, input a topic (e.g., to system 600), enter an identity of a source topic, and/or otherwise enter information. A user may, for example, enter a topic (e.g., a source topic) in order to determine other topics that may be of interest to the user. A user may, for example, wish to identify possible topics of interest to the user based on a source topic. Based on the information input from the user, similarity scores may be generated between a source topic and one or more topics, one or more similar topics may be selected based on the similarity scores, and one or more similar topics may be output. One or more similar topics may be output to a user (e.g., using a component of system 600), to system 600, and/or to another system or device.

According to some aspects, a representation of one or more similar topics may be output. A representation of similar users may be, for example, a graphical representation of similar topics (e.g., a graphical model, graph, plot, table, bar graph, pie chart, or other graphical representation of similar users), a list of similar topics (e.g., a list or table of similar users in a preview pane, window, or other displays), and/or any other type of data representation.

In some aspects, an identity of one or more overlapping users and a value indicating a degree of overlap (e.g., user overlap value) for each overlapping user may be output. Overlapping users (e.g., common users, shared users) may be, for example, users associated with two or more topics (e.g., both a first topic, a second topic, and possibly other topics). For example, topic information for a first topic (e.g., topic B) may include three users: user X, user Y, and user Z and a topic value for each user: user X topic value (e.g., 0.31), user Y topic value (e.g., 0.38), and user Z topic value (e.g., 0.31). Topic information for a second topic (e.g., topic C) may include two users: user X and user Y and a topic value for each user: user X topic value (e.g., 0.6) and user Y topic value (e.g., 0.4). In this example, overlapping users for the first topic (e.g., topic B) and the second topic (e.g., topic C) may include user X and user Y. A degree of overlap for each overlapping user may be computed based on a similarity score between the first topic and the second topic for that overlapping user. A degree of overlap for a user (e.g., a degree of user overlap) between a first topic and a second topic may be equal to, for example, a product of a topic value for the first topic for that user and a topic value for the second topic for that user.

By way of example, a value representing a degree of overlap for user X between the first topic (e.g., topic B) and the second topic (e.g., topic C) may be equal to a product of a topic value for topic C for user X (e.g., 0.6) and topic value for topic B for user X (e.g., 0.31), which may equal to 0.19. Similarly, a value representing a degree of overlap for user Y between the first topic (e.g., topic B) and the second topic (e.g., topic C) may be equal to 0.15. The one or more overlapping users (e.g., user X and user Y) and a value indicating a degree overlap (e.g., user X overlap value=0.19 and user Y overlap value=0.15) for each overlapping topic may be output.

In some aspects, one or more overlapping users associated with one or more highest degrees of overlap may be output. For example, overlapping users may be ranked in order of degree of overlap (e.g., in descending or ascending order of degree of overlap), and a highest ranked user may be selected and output. In some aspects, any number of highest ranked users (e.g., a top-N scoring and/or ranking users or a list of the top-N scoring and/or ranking users) may be output. A number of overlapping users selected and output may be determined by, for example, a user, a system or device in system 600, and/or any other system or device.

In some aspects, one or more overlapping users associated with degrees of overlap above a threshold degree of overlap may be output. A threshold degree of overlap may be, for example, a predefined threshold degree of overlap (e.g., a fixed degree of overlap), an automatically determined threshold degree of overlap, or other type of threshold. A predetermined degree of overlap may be determined by, for example, a user, a system or device associated with system 600, and/or any other system or device. An automatically determined threshold similarity score may be generated, for example, using an automatic threshold detection process or other approaches. An automatically determined threshold degree of overlap may be used in a clustering method (e.g., K-means clustering, hierarchical agglomerative clustering, or another clustering algorithm) to group or cluster sets of users based on degree of overlap. One or more users in a group or cluster of users may be output.

Figure 2:
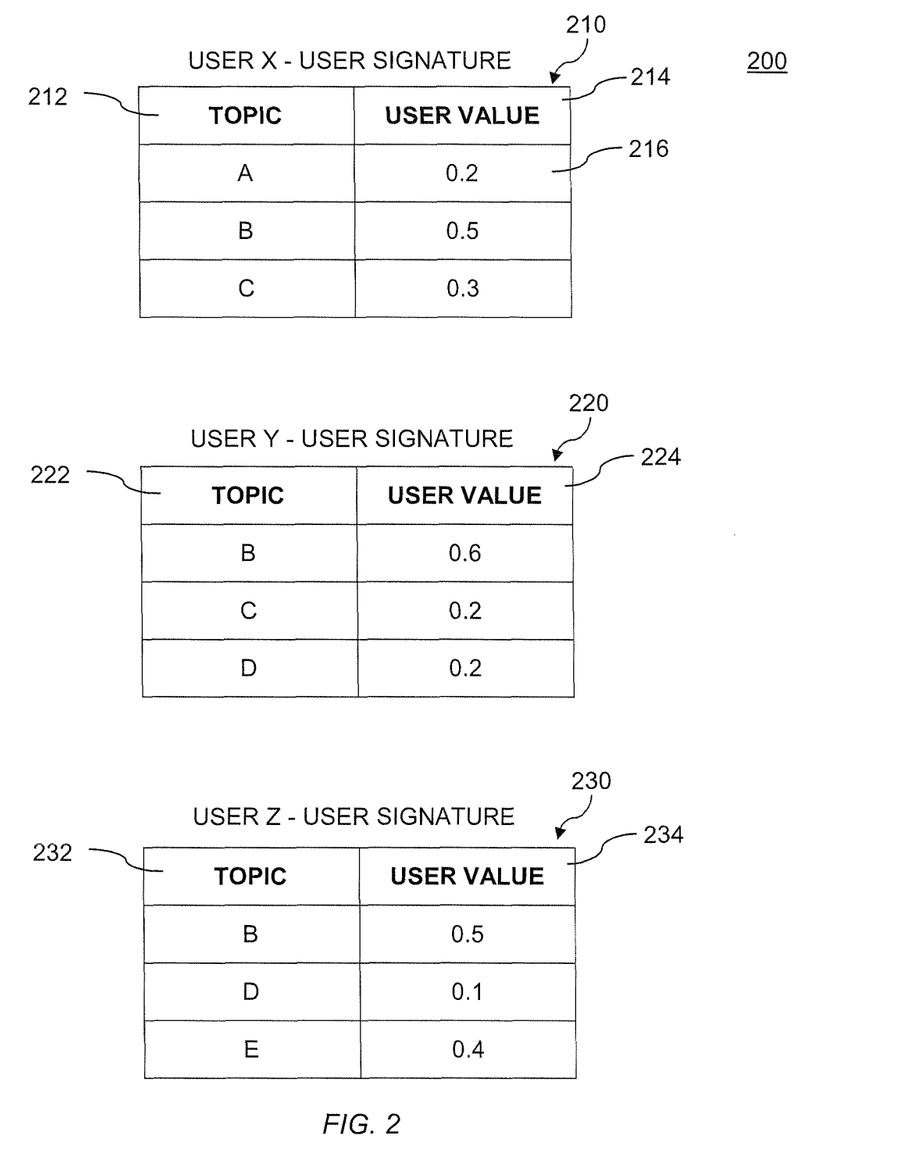
FIG. 2 is a diagram of user signatures according to aspects of the present disclosure.

FIG. 2 shows a diagram 200 of user signatures according to aspects of the present disclosure. User signatures for one or more users (e.g., user X user signature 210, user Y user signature 220, and user Z user signature 230) may be received. Each user signature may include user information for a user (e.g., user X, user Y, and user Z). User information for a user may include at least one topic, a user value for each topic, and/or other information.

In this example, user information and/or a user signature for user X 210 may include at least one topic 212 (e.g., three topics), a user value for each topic 214, and/or other information. A user signature for user X 210 may include three topics 212: topic A, topic B, and topic C and a user value for each topic 214: topic A user value (e.g., 0.2), topic B user value (e.g., 0.5), and topic C user value (e.g., 0.3). Each user value for a topic may represent, for example, how strongly user X is associated with that topic.

In some aspects, user values for each topic may be normalized such that all normalized user values for a user sum to 1.0, 100%, and/or any other value. Normalized user values may be computed or generated by dividing each user value for a topic by a sum of all user values for that user for each topic. User values for user X for each topic 214 in this example may be normalized user values. The user values for user X for each topic 214 may have been generated or computed by dividing the user value for each topic by a sum of all user values for user X for each topic.

In this example, user information and/or a user signature for user Y 220 may include at least one topic 222 (e.g., three topics), a user value for each topic 224, and/or other information. A user signature for user Y 220 may include three topics 222: topic B, topic C, and topic D and a user value for each topic 224: topic B user value (e.g., 0.6), topic C user value (e.g., 0.2), and topic D user value (e.g., 0.2).

In this example, user information and/or a user signature for user Z 230 may include at least one topic 232 (e.g., three topics), a user value for each topic 234, and/or other information. A user signature for user Z 230 may include three topics 232: topic B, topic D, and topic E and a user value for each topic 234: topic B user value (e.g., 0.5), topic D user value (e.g., 0.1), and topic E user value (e.g., 0.4).

Figure 3:
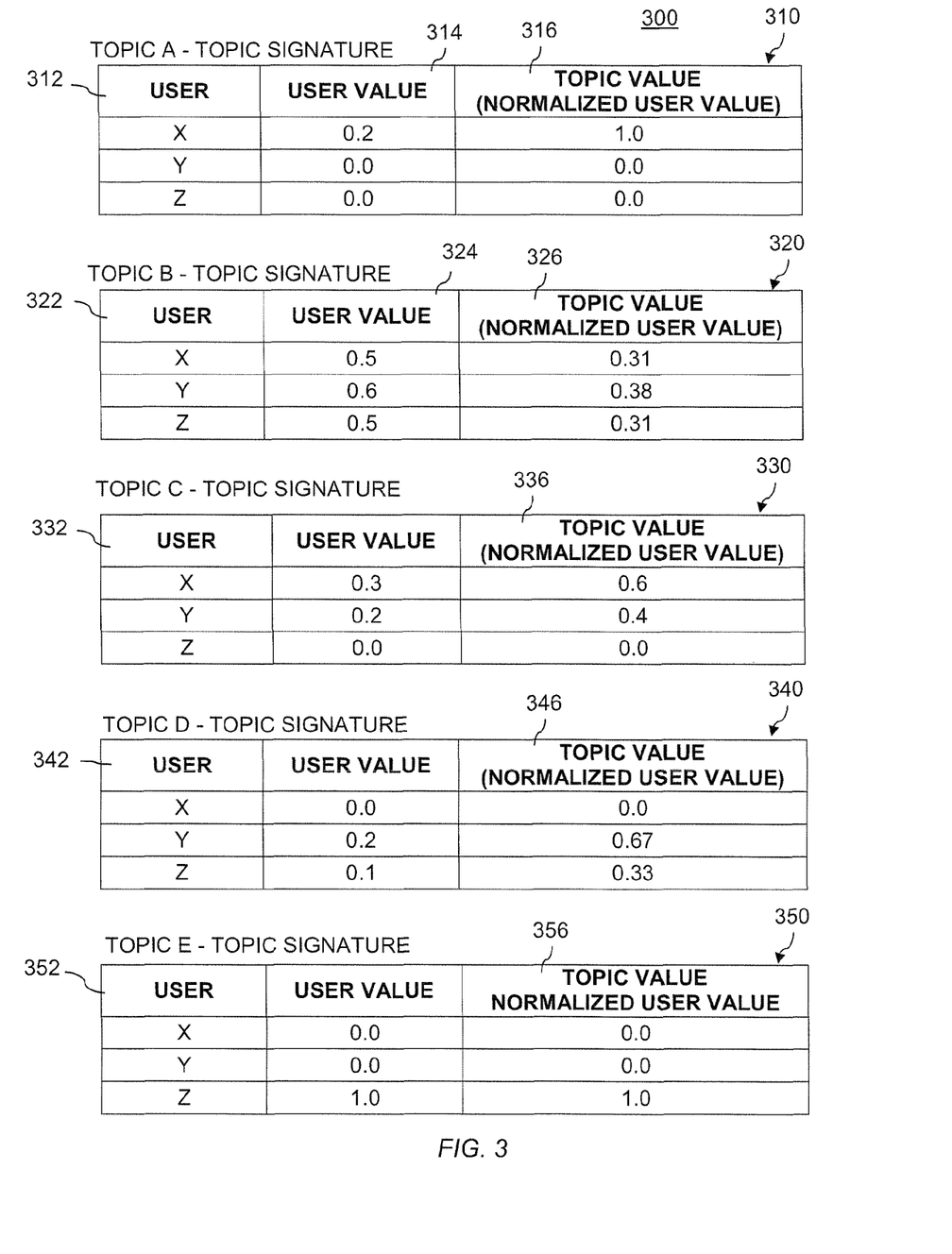
FIG. 3 is a diagram of topic signatures according to aspects of the present disclosure.

FIG. 3 shows a diagram 300 of topic information for one or more topics according to aspects of the present invention. Topic information and/or topic signatures (e.g., topic A topic signature 310, topic B topic signature 320, topic C topic signature 330, topic D topic signature 340, topic E topic signature 350) for one or more topics (e.g., topic A, topic B, topic C, topic D, and topic E) may be generated based on user information. Topic information may include at least one user and a topic value for each user. The topic value may represent how strongly the topic is associated with that user.

A topic value may, in some aspects, be equivalent to and/or may be based on a user value. Topic information for a topic may be generated by referencing and storing user values for one or more users for that topic. User values for one or more topics may, for example, be stored in an array, vector, matrix, table, and/or other data structure.

In some aspects, one or more user values (e.g., each user value for a topic for that user) may be normalized to generate topic values (e.g., normalized user values) for each user. User values for each topic may be normalized such that all topic values for a topic (e.g., normalized user values) sum to 1.0, 100%, and/or any other value. Topic values (e.g., normalized user values) may be computed and/or generated by, for example, dividing each user value for each of one or more users for that topic by a sum of all user values for each of the one or more users for that topic.

In this example, topic information and/or topic signature for topic A 310 may include at least one user 312 (e.g., one user: user X), a topic value 316 for each user (e.g., a normalized user value), and possibly other information. Topic values 316 for topic A for each user may be generated by normalizing user values for each user for topic A 314. A user value for user X may, for example, be normalized to generate a topic value for user X. A topic value for user X may be computed and/or generated by, for example, dividing a user value for user X for topic A (e.g., 0.2) by a sum of all user values for each of one or more users for topic A (e.g., user value for user X for topic A=0.2). A topic value for topic A for user X may be, for example, 1.0. A topic value for topic A for user Y and a topic value for topic A for user Z may be equal to zero indicating that user Y and user Z may not have interacted (e.g., substantially interacted) with files (e.g., documents) including content related to topic A.

In this example, topic information and/or topic signature for topic B 320 may include at least one user 322 (e.g., three users: user X, user Y, user Z), a topic value 326 for each user, and possibly other information. Topic values 326 for topic B for each user may be generated by normalizing user values for each user for topic B 324. A topic value for topic B for user X (e.g., 0.31) may be generated based on a user value for user. X for topic B (e.g., 0.5) and a sum of all user values for one or more user values for topic B 324. A topic value for topic B for user X may be computed and/or generated by, for example, dividing a user value for user X for topic B (e.g., 0.5) by a sum of all user values for each of one or more users for topic B (e.g., user value for user X+user value for user Y+user value for user Z=1.6). A topic value for topic B for user X may be, for example, 0.31. Similarly, a topic value for user Y for topic B may be equal to 0.38, and a topic value for user Z for topic B may be equal to 0.31.

In this example, topic information and/or topic signature for topic C 330 may include two users 332 (e.g., user X, user Y), a topic value 336 for each user, and possibly other information. A topic value for topic C for user X (e.g., 0.6) and a topic value for topic C for user Y (e.g., 0.4) may be calculated using an approach similar to the methods and/or approaches discussed above in reference to topic signature for topic A 310 and topic signature for topic B 320.

In this example, topic information and/or topic signature for topic D 340 may include two users 342 (e.g., user Y, user Z), a topic value 346 for each user, and possibly other information. A topic value for topic D for user Y (e.g., 0.67) and a topic value for topic D for user Z (e.g., 0.33) may be calculated using an approach similar to the methods and/or approaches discussed above in reference to topic signature for topic A 310 and topic signature for topic B 320.

In this example, topic information and/or topic signature for topic E 350 may include one user 352 (e.g., user Z), a topic value for each user 356, and possibly other information. A topic value for topic E for user Z (e.g., 1.0) may be calculated using an approach similar to the methods and/or approaches discussed above in reference to topic signature for topic A 310 and topic signature for topic B 320.

Figure 4:
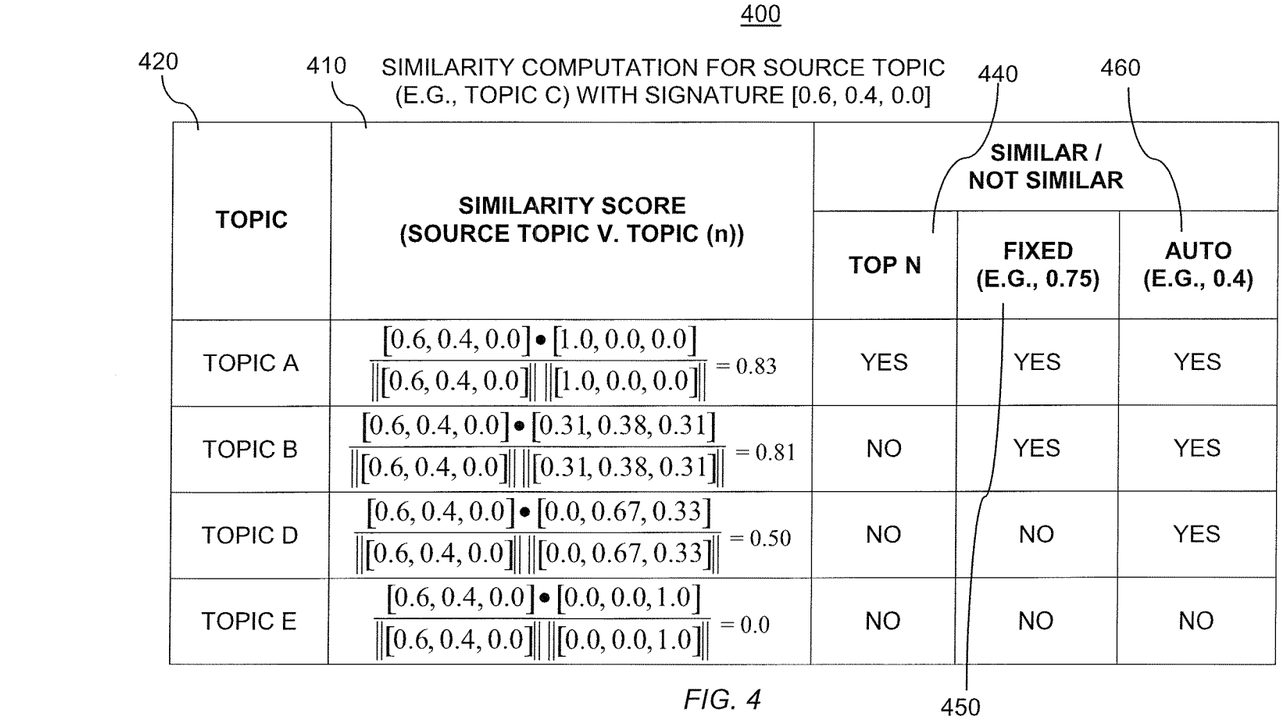
FIG. 4 is a diagram of similarity scores for a topic according to aspects of the present disclosure.

FIG. 4 shows a diagram 400 of similarity scores for a source topic according to aspects of the present invention. Similarity scores may be generated based on a topic value for each user for a source topic and a topic value for the same user for each topic in a set of topics. Similarity scores may, for example, be generated by computing a cosine similarity of topic values for each user. A cosine similarity of topic values for each user may, for example, be calculated based on a vector including and/or representing topic values for a source topic and a vector including topic values for a topic in a set of topics.

By way of example, similarity scores 410 may be generated between a source topic (e.g., topic C) and one or more topics 420 (e.g., topic A, topic B, topic D, and topic E) in a set of topics. In this example, a source topic may be topic C, and the topics 420 in a set of topics may be topic A, topic B, topic D, and topic E (as discussed above in connection with FIG. 2 and FIG. 3). In this example, topic values for a source topic (e.g., topic C) for each user may be, for example, a vector of topic values (e.g., [0.6, 0.4, 0.0]), where a topic value for the source topic for user X is equal to 0.6, a topic value for user Y is equal to 0.4, and a topic value for user Z is equal to 0.0. Topic values for topic A for each user may be, for example, be a vector of topic values (e.g., [1.0, 0.0, 0.0]). Topic values for topic B for each user may be, for example, be a vector of topic values (e.g., [0.31, 0.38, 0.31]). Topic values for topic D for each user may be, for example, be a vector of topic values (e.g., [0.0, 0.67, 0.33]). Topic values for topic E for each user may be, for example, be a vector of topic values (e.g., [0.0, 0.0, 1.0]).

A similarity score 410 (e.g., a cosine similarity of topic values) between a source topic and topic A may be generated by computing and/or calculating a dot product of a vector representing topic values for a source topic (e.g., [0.6, 0.4, 0.0]) and a vector representing topic values for topic A (e.g., [1.0, 0.0, 0.0]) and dividing the dot product by the product of the norm of the vector representing topic values for the source topic (e.g., ||[0.6, 0.4, 0.0,]||) and the norm of the vector representing topic values for a topic A (e.g., ||[1.0, 0.0, 0.0]||). A cosine similarity of topic values between a source topic and topic A may, in this example, be equal to 0.83 or another value.

A cosine similarity of topic values may be computed by calculating a dot product of a vector representing topic values for a source topic (e.g., [0.6, 0.4, 0.0]) and a vector representing topic values for topic B (e.g., [0.31, 0.38, 0.31]) and dividing the dot product by the product of the norm of the vector representing topic values for the source topic (e.g., ||[0.6, 0.4, 0.0,]||) and the norm of the vector representing topic values for topic B (e.g., ||[0.31, 0.38, 0.31]||). A cosine similarity of topic values between a source topic and topic B may, in this example, be equal to 0.81 or another value.

A cosine similarity of topic values between a source topic and topic D may generated using similar methods and/or approaches as those used above to generate cosine similarity values between a source topic and topic A and topic B. A cosine similarity of topic values between a source topic and topic D may be equal to 0.5 or another value.

Similarly, a cosine similarity of topic values between a source topic and topic E may be equal to 0.0 or another value. A cosine similarity of 0.0 may indicate that the source topic and topic E do not share any common users and may indicate that the source topic and topic E are not related and/or are not similar.

One or more similar topics may be selected based on generated similarity scores (e.g., cosine similarity scores 410). In some aspects, one or more topics associated with one or more highest similarity scores may be selected. In this example, a similarity score between a source topic and topic A (e.g., 0.83) may be higher than a similarity score between the source topic and topic B (e.g., 0.81), topic D (e.g., 0.5), or topic E (e.g., 0.0). An indication of the highest ranked topics 440 may be generated based on a ranked list of topics. A ranked list of topics based on similarity scores may include, for example, topic A ranked above topic B, topic B ranked above topic D, and topic D ranked above topic E. In one example, it may be specified that a highest ranked topic should be selected and output, and topic A may, for example, be selected and output (e.g., to a user, system 600, or another system or device). In some aspects, any number of topics (e.g., a top-N scoring and/or ranking topics or a list of the top-N scoring and/or ranking topics) may be output (e.g., to a user, system 600, or another system or device). The column labeled "TOP N" 440 may indicate whether a similarity score for a topic (e.g., topic A, topic B, topic D, or topic E) is among the top N (e.g., in this example a top one (N=1) and/or highest) similarity scores.

One or more similar topics may be selected based on a threshold similarity score. A threshold similarity score may be, for example, a predetermined or fixed threshold similarity score 450, an automatically determined threshold similarity score 460, and/or any other type of threshold similarity score.

In this example, a predetermined threshold similarity score 450 may be equal to 0.75 or any other value. A predetermined threshold similarity score may be set and/or defined by a user, by system 600, and/or by any other system or device. A similarity score between a source topic and topic A (e.g., 0.83) may, for example, be higher than a predetermined threshold similarity score 450 (e.g., 0.75). Similarly, a similarity score between a source topic and topic B (e.g., 0.81) may, for example, be higher than a predetermined threshold similarity score 450 (e.g., 0.5). In this example, based on the predetermined threshold similarity score, topic A and topic B may be deemed similar topics and an identity of topic A and topic B may be output (e.g., for display to a user or to system 600). The column labeled "FIXED (E.G., 0.75)" 450 may indicate whether a similarity score for a topic (e.g., topic A, topic B, topic D, or topic E) is above a predefined threshold (e.g., 0.75).

By way of example, an automatically determined threshold similarity score 460 may be equal to 0.4 or any other value. A similarity score between a source topic and topic A (e.g., 0.83), a similarity score between the source topic and topic B (e.g., 0.81), and a similarity score between the source topic and topic D (e.g., 0.5) may, for example, be higher than an automatically determined threshold similarity score 460 (e.g., 0.4). Topic A, topic B, and topic D may, therefore, be deemed a similar topics and the identity of topic A, topic B, and topic D may be output (e.g., for display to a user or to system 600). A similarity score between a source topic and topic E (e.g., 0.0) may, for example, be lower than a automatically determined threshold similarity score 460 (e.g., 0.4). In this example, topic E may be deemed a not similar topic and the identity of topic E may not be output. The column labeled "AUTO (E.G., 0.4)" 460 may indicate whether a similarity score for a topic (e.g., topic A, topic B, topic D, or topic E) is above an automatically determined threshold (e.g., 0.4).

Figure 5:
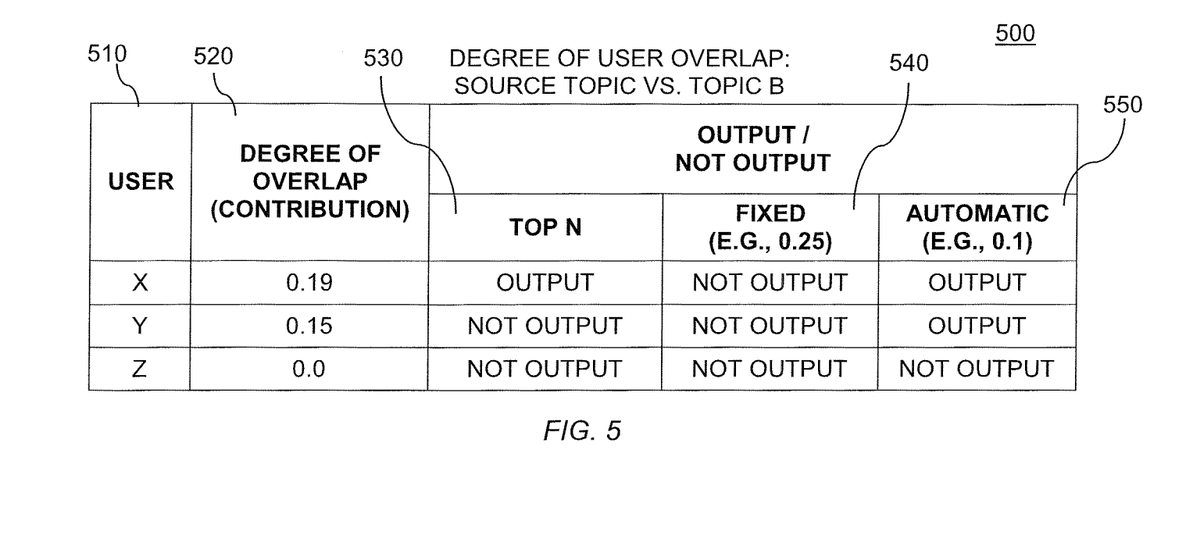
FIG. 5 is a diagram of user overlap between topics according to aspects of the present disclosure.

FIG. 5 shows a diagram 500 depicting topic overlap according to aspects of the present invention. According to some aspects, an identity of one or more overlapping users and a value indicating a degree of overlap (e.g., user overlap value) for each overlapping user may be output. Overlapping users (e.g., common users, shared users) may be, for example, one or more users each associated with two or more topics.

In this example, a value representing a degree of overlap 520 for each overlapping user 510 between a source topic (e.g., topic C) and topic B may be generated. Topic information for a source topic and topic B may be the topic information as discussed above in connection with FIG. 3 and FIG. 4. Topic information for a source topic may include, for example, three users: user X, user Y and a topic value for each user: user X topic value (e.g., 0.6) and a user Y topic value (e.g., 0.4). Topic information for topic B may include three users (e.g., user X, user Y, and user Z) and a topic value for each user: user X topic value (e.g., 0.31), user Y topic value (e.g., 0.38), user Z topic value (e.g., 0.31). In this example, overlapping users 510 between the source topic (e.g., topic C) and topic B may include user X and user Y. A degree of overlap for each overlapping user 520 may be computed based on a similarity score between the source topic and topic B for each user and/or a product of topic values for the source topic and topic B. For example, a value representing a degree of overlap for user X between the source topic (e.g., topic C) and topic B may be equal to a product of a topic value for user X for the source topic (e.g., 0.6) and topic value for user X for topic B (e.g., 0.31), which may equal to 0.19. Similarly, a value representing a degree of overlap for user Y between the source topic and topic B may be equal to 0.15. A degree of overlap for user Z between the source topic and topic B may be zero (e.g., 0.0) indicating that user Z is not an overlapping user. An identity of the one or more overlapping users 510 (e.g., user X and user Y) and a value indicating a degree of overlap 520 (e.g., user X overlap value=0.19 and user Y overlap value=0.15) for each overlapping user may be output.

In some aspects, one or more overlapping users associated with one or more highest degrees of overlap 530 may be output. Overlapping users may, for example, be ranked in order of degree of overlap 520 (e.g., in descending or ascending order of degree of overlap), and a highest ranked one or more users may be selected and output. In some aspects, any number of highest ranked users (e.g., a top-N scoring and/or ranking users or a list of the top-N scoring and/or ranking users) may be output. In this example, a highest ranked overlapping user between a source topic and topic B may be user X because user X is associated with a highest degree of overlap value 520 equal to 0.19. An identity of user X may, therefore, be output. The column labeled "TOP N" 530 may indicate whether a degree of overlap for a user (e.g., user X, user Y, or user Z) is among the top N (e.g., in this example a top one, N=1 or highest) similarity scores.

In some aspects, one or more overlapping users associated each associated with a degree of overlap above a threshold degree of overlap may be output. A threshold degree of overlap may be, for example, a predefined or fixed threshold degree of overlap 540 (e.g., a fixed degree of overlap), an automatically determined threshold degree of overlap 550, or other type of threshold. A fixed threshold degree of overlap 540 may be determined by, for example, a user, a system or device associated with system 600, and/or any other system or device. An automatically determined threshold degree of overlap 550 may be generated, for example, using an automatic threshold detection process or other approaches.

In this example, a predetermined or fixed threshold degree of overlap 540 may be equal to 0.25 or any other value. A degree of overlap for user X between a source topic and topic B may be equal to 0.19, which is less than the predetermined threshold degree of overlap 540 of 0.25. A degree of overlap for user Y between a source topic and topic B may be equal to 0.15, which is less than the predetermined threshold degree of overlap 540 of 0.25. A degree of overlap for user Z between a source topic and topic B may be equal to 0.0, which is less than the predetermined threshold degree of overlap 540 of 0.25. Based on a predetermined threshold degree of overlap, user X, user Y, and user Z may not be output. The column labeled "FIXED (E.G., 0.25)" 440 may indicate whether a degree of overlap for user (e.g., user X, user Y, or user Z) is above a predefined threshold (e.g., 0.25). The fact that no users are output may possibly indicate that the predetermined threshold value may be set too high (e.g., by a user), or it may indicate that none of the users (e.g., users X, Y, or Z) is strongly associated with both the source topic and topic B.

In this example, an automatically determined threshold degree of overlap 550 may be equal to 0.1 or any other value. A degree of overlap for User X between a source topic and topic B may be equal to 0.19, which is greater than the automatically determined threshold degree of overlap 550 of 0.1. A degree of overlap for user Y between a source topic and topic B may be equal to 0.15, which is greater than the predetermined threshold degree of overlap 540 of 0.1. User X and User Y may, therefore, be output to, for example, a user, system 600, or any other system or device. The column labeled "AUTO (E.G., 0.1)" 550 may indicate whether a degree of overlap for user (e.g., user X, user Y, or user Z) is above an automatically determined threshold (e.g., 0.1).

In this example, an automatically determined threshold degree of overlap (e.g., 0.1) may be more effective in identifying overlapping users than a predetermined threshold (e.g., 0.25). Because an automatically determined threshold may be generated based on a distribution of degree of overlap values, the automatically determined threshold may be more accurate in determining overlapping users between, for example, the source topic and topic B.

FIG. 6 shows an illustrative computer system 600 suitable for implementing methods and systems according to an aspect of the present disclosure. The computer system may comprise, for example, a computer running any of a number of operating systems. The above-described methods of the present disclosure may be implemented on the computer system 600 as stored program control instructions.

Computer system 600 includes processor 610, memory 620, storage device 630, and input/output structure 640. One or more input/output devices may include a display 645. One or more busses 650 typically interconnect the components, 610, 620, 630, and 640. Processor 610 may be a single or multi core.

Processor 610 executes instructions in which aspects of the present disclosure may comprise steps described in one or more of the Figures. Such instructions may be stored in memory 620 or storage device 630. Data and/or information may be received and output using one or more input/output devices.

Memory 620 may store data and may be a computer-readable medium, such as volatile or non-volatile memory, or any transitory or non-transitory storage medium. Storage device 630 may provide storage for system 600 including for example, the previously described methods. In various aspects, storage device 630 may be a flash memory device, a disk drive, an optical disk device, or a tape device employing magnetic, optical, or other recording technologies.

Input/output structures 640 may provide input/output operations for system 600. Input/output devices utilizing these structures may include, for example, keyboards, displays 645, pointing devices, and microphones—among others. As shown and may be readily appreciated by those skilled in the art, computer system 600 for use with the present disclosure may be implemented in a desktop computer package 660, a laptop computer 670, a hand-held computer, for example a tablet computer, personal digital assistant, mobile device, or smartphone 680, or one or more server computers that may advantageously comprise a "cloud" computer 690.

The systems and methods discussed herein and implemented using, for example, system 600, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for determining topic similarity, comprising:
  receiving user information for one or more users, at a computer system, the information including at least one topic and a user value for each topic, where:
    the user value includes a user authority value representing a user expertise related to that topic and a user interest value representing a degree of user association with that topic, and
    the user value represents how strongly the user is associated with that topic;
  generating topic information for a source topic based on the user information, the topic information including at least one user and a topic value for each user, where the topic value represents how strongly the topic is associated with that user;
  generating similarity scores based on a topic value for each user for the source topic and a topic value for the same user for each topic in a set of topics, where each topic in the set of topics is associated with a topic value for each user;
  selecting one or more similar topics based on the generated similarity scores;
  determining and outputting one or more overlapping users and a value representing a degree of overlap for each overlapping user; and
  outputting one or more of the selected topics.

2. The method of claim 1, wherein the step of generating similarity scores includes computing a cosine similarity of topic values for each user.

3. The method of claim 1, wherein the outputting the selected topics step comprises:
  outputting, in response to input from a user, an identity of one or more selected topics.

4. The method of claim 1, wherein the outputting the selected topics step comprises:
  outputting a graphical representation of the one or more selected topics.

5. The method of claim 1, wherein the receiving, generating topic information, generating similarity scores, selecting, and outputting steps are initiated in response to a user selecting a source topic.

6. The method of claim 1, wherein the selecting step comprises selecting one or more similar topics associated with one or more highest generated similarity scores.

7. The method of claim 1, wherein the one or more similar topics are selected based on a predefined threshold similarity score.

8. The method of claim 1, wherein the one or more similar topics are selected based on an automatically determined threshold similarity score.

9. The method of claim 8, wherein the automatically determined threshold similarity score is determined using an automatic threshold detection process.

10. The method of claim 1, wherein the receiving step comprises:
  receiving the user information from a user.

11. The method of claim 1, wherein the receiving step comprises:
  receiving the user information from an automatic process operating on data associated with the one or more users.

12. The method of claim 1, wherein all the steps are repeated for each topic in a set of topics.

13. The method of claim 12, further comprising:
  outputting one or more groups of topics, where each topic in the set of topics is assigned to a group based on the generated similarity scores.

14. The method of claim 12, further comprising:
  outputting a title for a group of topics based on the topics in the group.

15. The method of claim 1, wherein the outputting overlapping users step comprises:
  outputting an identity of one or more overlapping users associated with one or more highest degrees of overlap.

16. The method of claim 1, wherein the one or more overlapping users are selected based on a degree of overlap being above a predetermined threshold degree of overlap.

17. The method of claim 1, wherein the one or more overlapping users are selected based on a degree of overlap being above an automatically determined threshold degree of overlap.

18. The method of claim 1, wherein the generating topic information step comprises:
referencing and storing, for each topic, the user value associated with that topic; and
normalizing over all user values for that topic to generate topic values for that topic, where the user values sum to 1.0 or 100%.

19. A computer-implemented system for determining similar topics comprising:
a non-transitory memory; and
said system operable to:
receive user information for one or more users, the information including at least one topic and a user value for each topic, where:
the user value includes a user authority value representing a user expertise related to that topic and a user interest value representing a degree of user association with that topic, and
the user value represents how strongly the user is associated with that topic;
generate topic information for a source topic based on the user information, the topic information including at least one user and a topic value for each user, where the topic value represents how strongly the topic is associated with that user;
generate similarity scores based on a topic value for each user for the source topic and a topic value for the same user for each topic in a set of topics, where each topic in the set of topics is associated with a topic value for each user;
select one or more similar topics based on the generated similarity scores;
determine and output one or more overlapping users and a value representing a degree of overlap for each overlapping user; and
output one or more of the selected topics.

20. The method of claim 19, wherein to generate similarity scores, said system is to compute a cosine similarity of topic values for each user.

21. A computer storage medium having computer executable instructions which when executed by a computer cause the computer to perform operations comprising:
receiving a source topic identified by a user;
receiving user information for one or more users, the information including at least one topic and a user value for each topic, where:
the user value includes a user authority value representing a user expertise related to that topic and a user interest value representing a degree of user association with that topic, and
the user value represents how strongly the user is associated with that topic;
generating topic information for the source topic based on the user information, the topic information including at least one user and a topic value for each user, where the topic value represents how strongly the topic is associated with that user;
generating similarity scores based on a topic value for each user for the source topic and a topic value for the same user for each topic in a set of topics, where each topic in the set of topics is associated with a topic value for each user;
selecting one or more similar topics based on the generated similarity scores;
determining and outputting one or more overlapping users and a value representing a degree of overlap for each overlapping user; and
outputting one or more of the selected topics.

* * * * *